United States Patent [19]

Greiner

[11] Patent Number: 5,495,790

[45] Date of Patent: Mar. 5, 1996

[54] PISTON CATCHER FOR A PYROTECHNIC LINEAR PISTON AND CYLINDER DRIVE

[75] Inventor: Hartmut Greiner, Alfdorf, Germany

[73] Assignee: TRW Repa GmbH, Alfdorf, Germany

[21] Appl. No.: 373,985

[22] Filed: Jan. 18, 1995

[30] Foreign Application Priority Data

Jan. 18, 1994 [DE] Germany .............................. 9400764 U

[51] Int. Cl.$^6$ ................................................. F01B 11/02
[52] U.S. Cl. ............................. 92/85 R; 92/175; 280/806; 188/375
[58] Field of Search .............................. 188/371, 374, 188/375; 280/805, 806; 92/85 R, 175, 259, 258, 143

[56] References Cited

U.S. PATENT DOCUMENTS

| | | | |
|---|---|---|---|
| 1,760,581 | 5/1930 | Burns | 92/259 |
| 4,288,098 | 9/1981 | Tsuge et al. | 188/371 |
| 4,573,322 | 3/1986 | Föhl | 92/85 R |
| 5,310,219 | 5/1994 | Föhl | 280/806 |
| 5,411,291 | 5/1995 | Föhl | 280/806 |

FOREIGN PATENT DOCUMENTS

| | | |
|---|---|---|
| 0616928 | 9/1994 | European Pat. Off. . |
| 0614789 | 9/1994 | European Pat. Off. . |
| 0614790 | 9/1994 | European Pat. Off. . |
| 2349891 | 4/1975 | Germany . |
| 2918179 | 11/1980 | Germany ......................... 188/371 |
| 4224324 | 1/1993 | Germany . |
| 2129496 | 5/1984 | United Kingdom . |

*Primary Examiner*—Thomas E. Denion
*Attorney, Agent, or Firm*—Tarolli, Sundheim & Covell

[57] ABSTRACT

In a pyrotechnic linear piston and cylinder drive in a belt pretensioner, the cylinder (10) has a frustoconical free end (12) and the piston (14) is attached to the end of a cable (16). The piston (14) is tapered frustoconically at its end adjacent to the free end (12) of the cylinder (10). An annular piston member (22) is slipped over and frictionally engaged with the tapered end portion (20) of the piston (14). When the annular piston member (22) reaches the frustoconical free end (12) of the cylinder (10), the piston (14) is forced further into the annular piston member, deforming both parts and dissipating energy.

4 Claims, 1 Drawing Sheet

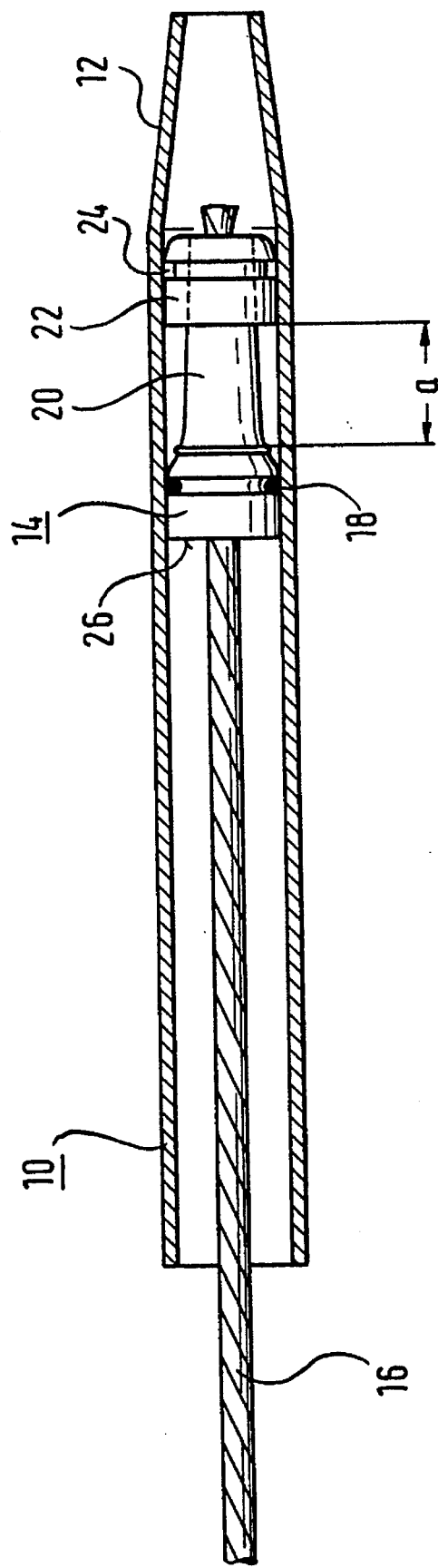

5,495,790

PISTON CATCHER FOR A PYROTECHNIC LINEAR PISTON AND CYLINDER DRIVE

BACKGROUND OF THE INVENTION

The invention relates to a piston catcher for a pyrotechnic linear piston and cylinder drive on a belt pretensioner, wherein the cylinder has a frustoconical free end.

With the increase in the performance of belt pretensioner drives the piston catcher forming part of the linear piston and cylinder drive is becoming increasingly important. The piston catcher must in all cases be capable of preventing the piston shooting out through the open end of the cylinder, more particularly if the safety belt is not in use and at raised temperatures by which the performance of the pyrotechnic gas generator is made more effective. For this purpose it is necessary for the kinetic energy of the piston and of the parts driven by the same to be absorbed by plastic deformation of the frustoconically tapering free end of the cylinder. For such absorption of energy a range of axial movement must be designed for, which increases with the increase in the power of the pyrotechnic gas generator.

SUMMARY OF THE INVENTION

An object of the present invention is to provide a piston catcher by which the necessary energy absorption is rendered possible without changing the short conical tapered end of the cylinder.

In the piston catcher in accordance with the invention the piston is tapered frustoconically at its end adjacent to the free end of the cylinder and an annular piston member is slipped over and frictionally engaged with the tapering part of the piston. When the annular piston member reaches the frustoconical free end of the cylinder further movement thereof is hindered by its striking the internal wall surface of the cylinder end, the frustoconically tapering end of the piston biting to an increasing extent into the annular piston member. The piston is now forced further inwards inside the annular piston member until the abutment constituted by the base of its frustoconical end is reached. Simultaneously or afterwards the annular piston member also moves into the frustoconically tapering end of the cylinder and splays it outwards. The entire path along which absorption or conversion of energy takes place, is equal to the sum on the one hand of the relative movement between the annular piston member and the piston and of the depth of penetration of the annular piston member into the frustoconical end of the cylinder. There is accordingly a telescoping effect, which renders possible a shortening of the free end of the cylinder provided for the energy absorption.

In accordance with an advantageous further development the annular piston member has its external diameter adapted to the diameter of the piston so that its axial motion is braked even at the start of the frustoconical taper at the free end of the cylinder. In accordance with an advantageous feature of the invention the annular piston member is furthermore provided with a surrounding groove in its outer cylindrical surface so that a plastic deformation of the annular piston member as well is favored.

BRIEF DESCRIPTION OF THE DRAWING

Further features and advantages of the invention will be gathered from the following description and from the drawing, to which reference should be had.

The single figure of the drawing shows an axial section taken through the terminal part of the cylinder with a piston, which has reached the free end of the cylinder.

DESCRIPTION OF THE PREFERRED EMBODIMENT

The cylinder 10, illustrated in the drawing, of a pyrotechnic piston and cylinder linear drive conventionally possesses a frustoconical tapering free or open end 12. A piston 14 is slidingly located within the cylinder 10 and it is furthermore attached to the end of a cable 16. The piston 14 has a peripherally extending groove in its cylindrical surface in order to accommodate a sealing ring 18. On the end adjacent to the free end 12 of the cylinder 10 the same is provided with a frustoconical, tapering part 20. An annular piston member 22 is mounted on the frustoconical tapered part 20. The annular piston member 22 consists of a plastically deforming material such as aluminum or a suitably selected synthetic resin and on its outer surface possesses a peripherally extending groove 24. The external diameter of the annular piston member 22 is generally equal to the diameter of the piston 14. As is seen in the drawing, the axial length of the tapering part 20 is substantially greater than that of the annular piston member 22.

On operation of a pyrotechnic gas generator (not illustrated) the end surface 26 of the piston 14 remote from the annular piston member 22 is subjected to pressure. Accordingly the piston 14 together with the annular piston member 22 is driven in its cylinder 10 towards the free end 12. When the annular piston member 22 gets as far as the beginning of the frustoconical taper end 12, its further progress is hindered by striking against the inner wall surface of such end 12. The piston 14 is however driven on further so that its frustoconical taper part 20 penetrates more deeply into the bore of the annular piston member 22. As the frustoconical part 20 moves still further into the bore of the annular piston member 22 both parts are plastically deformed until finally the abutment constituted by the end of the frustoconical part 20 strikes against the end surface of the annular piston member 22. Simultaneously or afterwards the annular piston member 22 forces its way into the frustoconical end 12 of the cylinder and splays it outward. In this respect there is also a plastic deformation of the annular piston member 22, which is favored by the groove 24. The distance, along which the plastic deformation of the annular piston member 22 and of the frustoconical part 20 of the piston 14 occurs, is indicated by the letter "a" in the drawing. This distance is functionally to be added to the distance, along which there is a plastic deformation of the frustoconical free end 12 of the cylinder 10.

What is claimed is:

1. A piston catcher for a pyrotechnic linear piston and cylinder drive on a safety belt pretensioner, wherein said cylinder has a free end of frustoconical shape and said piston has an end portion tapering towards said free cylinder end, an annular piston member of a plastically deformable material being slipped over and frictionally engaged with said tapering piston end portion, and said tapering piston end portion having an axial length substantially greater than an axial length of said annular piston member, and said annular piston member being normally located on the side of said free cylinder end.

2. The piston catcher of claim 1, wherein said annular piston member has an external diameter substantially equal to an external diameter of said piston.

3. The piston catcher of claim 1, wherein said annular piston member has an outer cylindrical surface with a peripherally extending groove therein.

4. The piston catcher of claim 1, wherein said piston is connected to a cable.

* * * * *